United States Patent [19]

Matsuoka et al.

[11] Patent Number: 5,710,679
[45] Date of Patent: Jan. 20, 1998

[54] MAGNETIC RECORDING AND REPRODUCING APPARATUS

[75] Inventors: Hidetoshi Matsuoka; Junji Kobayashi, both of Tokyo; Osamu Nagatsuka, Kanagawa-ken; Akira Tomitaka, Kanagawa-ken; Osamu Morita, Kanagawa-ken, all of Japan

[73] Assignee: Canon Kabushiki Kaisha, Tokyo, Japan

[21] Appl. No.: 430,130

[22] Filed: Apr. 25, 1995

Related U.S. Application Data

[63] Continuation of Ser. No. 158,191, Nov. 24, 1993, abandoned, which is a continuation of Ser. No. 713,159, Jun. 11, 1991, abandoned.

[30] Foreign Application Priority Data

| Jun. 13, 1990 | [JP] | Japan | 2-152768 |
| Sep. 4, 1990 | [JP] | Japan | 2-232552 |
| Nov. 15, 1990 | [JP] | Japan | 2-307236 |

[51] Int. Cl.$^6$ .................................................. G11B 5/027
[52] U.S. Cl. ................................................ 360/85; 360/95
[58] Field of Search ............................. 360/85, 95, 84, 360/130.21–130.24

[56] References Cited

U.S. PATENT DOCUMENTS

| 4,803,574 | 2/1989 | Konishi et al. | 360/85 |
| 4,868,693 | 9/1989 | Tsutsumi et al. | 360/95 |
| 4,949,203 | 8/1990 | Kunimaru et al. | 360/95 |
| 4,961,120 | 10/1990 | Mototake et al. | 360/85 |
| 5,016,125 | 5/1991 | Takeda et al. | 360/85 |
| 5,025,332 | 6/1991 | Tsuchida et al. | 360/85 |
| 5,065,264 | 11/1991 | Ohmori et al. | 360/95 |
| 5,077,624 | 12/1991 | Nakanishi | 360/95 |
| 5,089,921 | 2/1992 | Kodama et al. | 360/85 |
| 5,113,296 | 5/1992 | Kaneko et al. | 360/95 |
| 5,179,871 | 1/1993 | Orimoto et al. | 360/96.3 |
| 5,220,469 | 6/1993 | Nagata | 360/85 |

*Primary Examiner*—Jefferson Evans
*Attorney, Agent, or Firm*—Robin, Blecker, Daley and Driscoll

[57] ABSTRACT

In a magnetic recording and reproducing apparatus for recording and reproducing information by pulling out a tape from a cassette by revolving a pair of tape pull-out members in opposite directions with a tape loading mechanism and by wrapping the tape around a rotary drum, a tape pull-out aiding member is arranged in combination with one of the tape pull-out members; and a differential mechanism is arranged between the tape pull-out aiding member and the tape pull-out member to cause the two members to revolve at different angles of revolution in such a way as to give a desired angle of inclination of the tape relative to the rotary drum. The differential mechanism is formed jointly by a slide member which is slidable in the direction of revolution, the tape pull-out aiding member being disposed at the slide member, and a positioning member which is arranged to lock the tape pull-out aiding member by restricting its movement in such a way as to cause two members to revolve at the different angles of revolution.

13 Claims, 11 Drawing Sheets

MAGNETIC RECORDING AND REPRODUCING APPARATUS

This is a continuation of prior application Ser. No. 08/158,191, which was filed on Nov. 24, 1993, now abandoned, which is a continuation of Ser. No. 07/713,159, which was filed on Jun. 11, 1991, abandoned.

BACKGROUND OF THE INVENTION

1. Field of the Invention

This invention relates to a magnetic recording and reproducing apparatus which is capable of reliably performing tape loading within a space limited as a result of reduction in diameter of the rotary drum of a video tape recorder (hereinafter referred to as a VTR).

2. Description of the Related Art

The conventional VTRs have been arranged to be loaded with tapes by various methods which include parallel loading. The parallel loading method is called M loading and is performed as described below with reference to FIGS. 1(a) and 1(b) of the accompanying drawings.

Figures 1A, 1B:
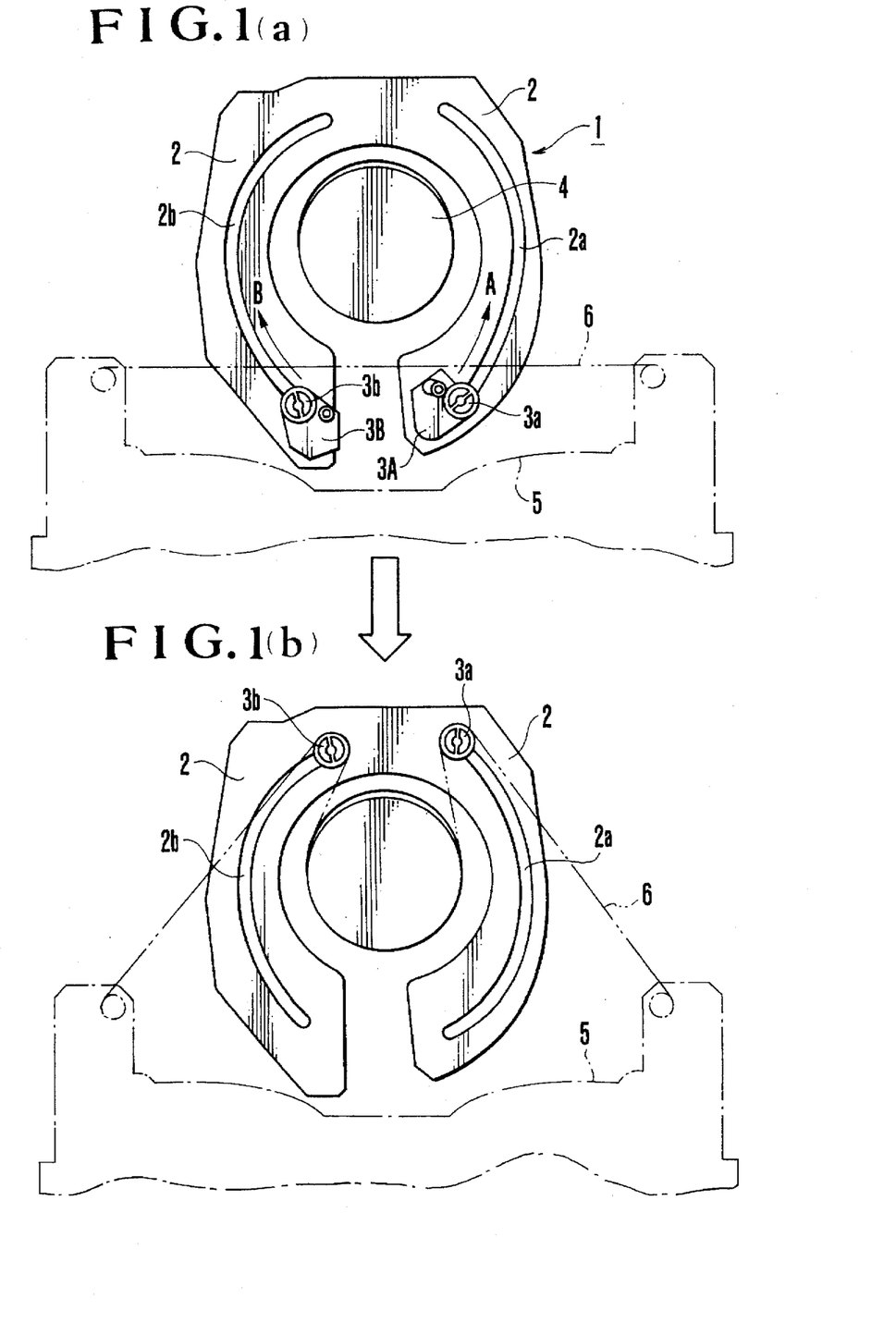
FIGS. 1(a) and 1(b) show by way of example the M loading operation of the conventional VTR.

In FIGS. 1(a) and 1(b), a reference numeral 1 denotes the body 1 of the VTR. A guide member 2 is provided with guide slots 2a and 2b. A pair of tape pull-out members (hereinafter referred to as pull-out members) 3A and 3B are respectively provided with guide rollers 3a and 3b which are opposed to each other. A numeral 4 denotes a rotary drum 4. A numeral 5 denotes a tape cassette. A numeral 6 denotes a tape which is arranged to have information recorded or reproduced on or from it.

The above-stated arrangement operates as follows: the VTR body 1 is first loaded with the tape cassette 5. Then, as shown in FIG. 1(a), the tape cassette 5 is set on the VTR body 1 in such a way as go have the guide rollers 3a and 3b of the pull-out members 3A and 3B interposed between the tape 6 and the cassette 5. Next, in response to an operation for recording or reproduction, loading rings which are not shown are driven to revolve the pull-out members 3A and 3B in the directions of arrows A and B1, respectively, with these members guided respectively by the guide slots 2a and 2b. This causes the tape 6 to be pulled out from the cassette 5 by the guide rollers 3a and 3b. The tape 6 is then wrapped around the rotary drum 4 from both sides thereof in a state as shown in FIG. 1(b). Information is then recorded or reproduced on or from the tape 6.

Efforts to reduce the size of the VTR by reducing the diameter of the rotary drum have recently become active. In such a case, the use of only a pair of right and left pull-out members for tape loading with the angle of inclination of the tape retained relative to the rotary drum is difficult. Therefore, a tendency of increasing the number of pull-out members has become conspicuous.

However, the above-stated conventional arrangement for coping with the reduction in diameter of the rotary drum makes the tape loading mechanism for driving the tape pull-out members more complex as the number of these pull-out members increases. As a result, the conventional arrangement has been thwarting the effort to reduce the size of the VTR.

Further, for the magnetic recording and reproducing apparatus such as the VTR, there has been proposed a mechanism for loading and unloading a magnetic tape on or from the head drum. That mechanism is arranged to have guide posts on two loading rings which are disposed in the neighborhood of the head drum; and loading and unloading is performed with the magnetic tape guided by rotating the rings in opposite directions. To arrange them in such a way as to encompass the drum driving system, etc., the loading rings are formed in a ring-like shape. The two rings are rotatably carried through rollers.

However, as a result of recent advancement of reduction in size of the VTR, the mounting arrangement of the above-stated ring members has become difficult. Besides, in many cases, these loading rings are arranged to be driven through such driving means as pinion gears, etc., which are mutually engaging. In order that these rings normally rotate in the two directions without having the component members of the driving system interfering and jamming in film loading or unloading, it is necessary to have a sufficient space between the two rings because of the above-stated arrangement of them.

However, in respect to the requirement for reduction in size and thickness of the apparatus, these rings are preferably spaced as narrow as possible.

SUMMARY OF THE INVENTION

This invention is directed to the solution of the problems of the prior art arrangements described by way of example in the foregoing. It is, therefore, an object of the invention to provide a magnetic recording and reproducing apparatus which is arranged to be capable of stably performing a tape loading action by reliably wrapping the tape around a rotary drum with the required angle of inclination of the tape retained relative to the rotary drum and yet with the increase in the number of tape pull-out members minimized, despite reduction in diameter of the rotary drum, and to permit simplification of the tape loading mechanism thereof.

To attain this object, a magnetic recording and reproducing apparatus which embodies this invention and is of the kind recording and reproducing information by pulling out a tape from a cassette by rotating a pair of tape pull-out members in opposite directions with a tape loading mechanism and by wrapping the tape around a rotary drum is arranged as follows: a tape pull-out aiding member is arranged in combination with one of the tape pull-out members. Differential means is arranged between the pull-out aiding member and the one of the tape pull-out members to revolve the two members at different angles of revolution in such a way as to give a desired angle of inclination of the tape relative to the rotary drum. The differential means is formed jointly by a slide member which is slidable in the direction of revolution, the tape pull-out aiding member being disposed at the slide member, and a positioning member which is arranged to lock the tape pull-out aiding member by restricting a movement of the tape pull-out member and that of the tape pull-out aiding member in such a way as to revolve the two members at the different angles of revolution. Further, the tape pull-out aiding member is swingably carried by a fore end of a slide arm which is expandably and contractibly carried in the longitudinal direction of an arm which is swingably carried by the slide member. The tape pull-out aiding member which is carried by the slide arm is further arranged to be unswingable in a first position where a distance between a fulcrum of the above-stated arm and that of the slide arm reaches a maximum value and to be swingable in a second position where the distance between the fulcrum of the arm and that of the slide arm reaches a minimum value. The arm and the slide arm are arranged to be urged by a torsion spring to move in the direction of revolution of the slide member and also in the direction of expansion of the slide arm during a process of wrapping the tape around the rotary drum. The urging force of the torsion spring which is exerted in the direction of revolution of the slide member is almost completely nullified and the urging force of the torsion spring is exerted only in the direction of expansion of the slide arm when the process of wrapping the tape around the rotary drum has ended. The object is attainable by this arrangement.

With the magnetic recording and reproducing apparatus arranged in the above-stated manner according to this invention, the tape pull-out aiding member is arranged in combination with one of the tape pull-out members of the loading mechanism. The differential means is arranged between the one of the tape pull-out member and the tape pull-out aiding member to revolve the two members at different angles of revolution. This differential means is formed jointly by the slide member which is slidable in the direction of revolution, the tape pull-out aiding member being disposed at the slide member, and the positioning member which is arranged to lock the tape pull-out aiding member to restrict its movement in such a way as to revolve the two members at the different angles of revolution. The differential means is thus arranged to revolve the two members. The tape pull-out aiding member then comes to be locked by the positioning member in a given position. After that, the tape pull-out member is further revolved to a greater angle of revolution than the tape pull-out aiding member and is thus brought without fail to a position where a desired angle of tape inclination of the tape relative to the rotary drum is reliably obtained. During this positioning process, to allow the tape pull-out member to be revolved without being hindered by the tape pull-out aiding member which is earlier set, the arm and the slide arm are contracted from the first position where the distance between the fulcrum of the arm and that of the slide arm is at its maximum value to the second position where the distance reaches its minimum value to allow the tape pull-out aiding member to begin to swing relative to the slide arm. This allows the tape pull-out member to be further revolved. With the angles of revolution of the two members thus differentiated by the differential means, the angle of inclination of the tape is stably obtained. Further, the resilient force of the torsion spring which urges the arm and the slide arm in the expanding direction and the direction of revolution of the slide member during the process of wrapping the tape around the rotary drum almost completely disappears in the direction of revolution of the slide member at the end of the tape wrapping process to alleviate a load imposed on the loading mechanism.

It is another object of the invention to provide a tape loading mechanism which is arranged for a magnetic recording and reproducing apparatus of the above-stated kind to simplify and facilitate assembly and mounting work on the component members thereof including the ring members mentioned in the foregoing.

To attain that object, a tape loading mechanism for a magnetic recording and reproducing apparatus of the kind wrapping a magnetic tape around a magnetic head carrying drum by rotating two ring members to which tape guide posts are connected is arranged as an embodiment of this invention in the following manner: the mechanism includes a drum base which is secured to a chassis of the magnetic recording and reproducing apparatus and is arranged to support the above-stated drum; and the above-stated two ring members are rotatably mounted on the drum base.

The arrangement to unitize the two ring members by mounting them on the drum base enables the tape loading mechanism including the drum base and the ring members to be simply and easily mounted on the magnetic recording and reproducing apparatus in a unitized state.

It is a further object of this invention to provide a magnetic recording and reproducing apparatus which is arranged to solve the problem mentioned in the foregoing relative to the loading rings by narrowing the space between them, so that the apparatus can be arranged in a smaller size and in a thinner shape.

To attain the above-stated object, a magnetic recording and reproducing apparatus of the kind loading or unloading a magnetic tape on or from a magnetic head drum through a plurality of loading rings which have a plurality of tape guide members driven by gears is arranged according to this invention to provide one of the above-stated plurality of loading rings with a protruding part on one side which is opposed to the other loading ring.

The above-stated protruding part provided on the confronting side of the loading ring ensures some space between the loading rings to permit a normal driving action on them without the fear of any interference.

These and other objects and features of this invention will become apparent from the following detailed description of embodiments thereof taken in conjunction with the accompanying drawings.

DETAILED DESCRIPTION OF THE PREFERRED EMBODIMENTS

Figure 2:
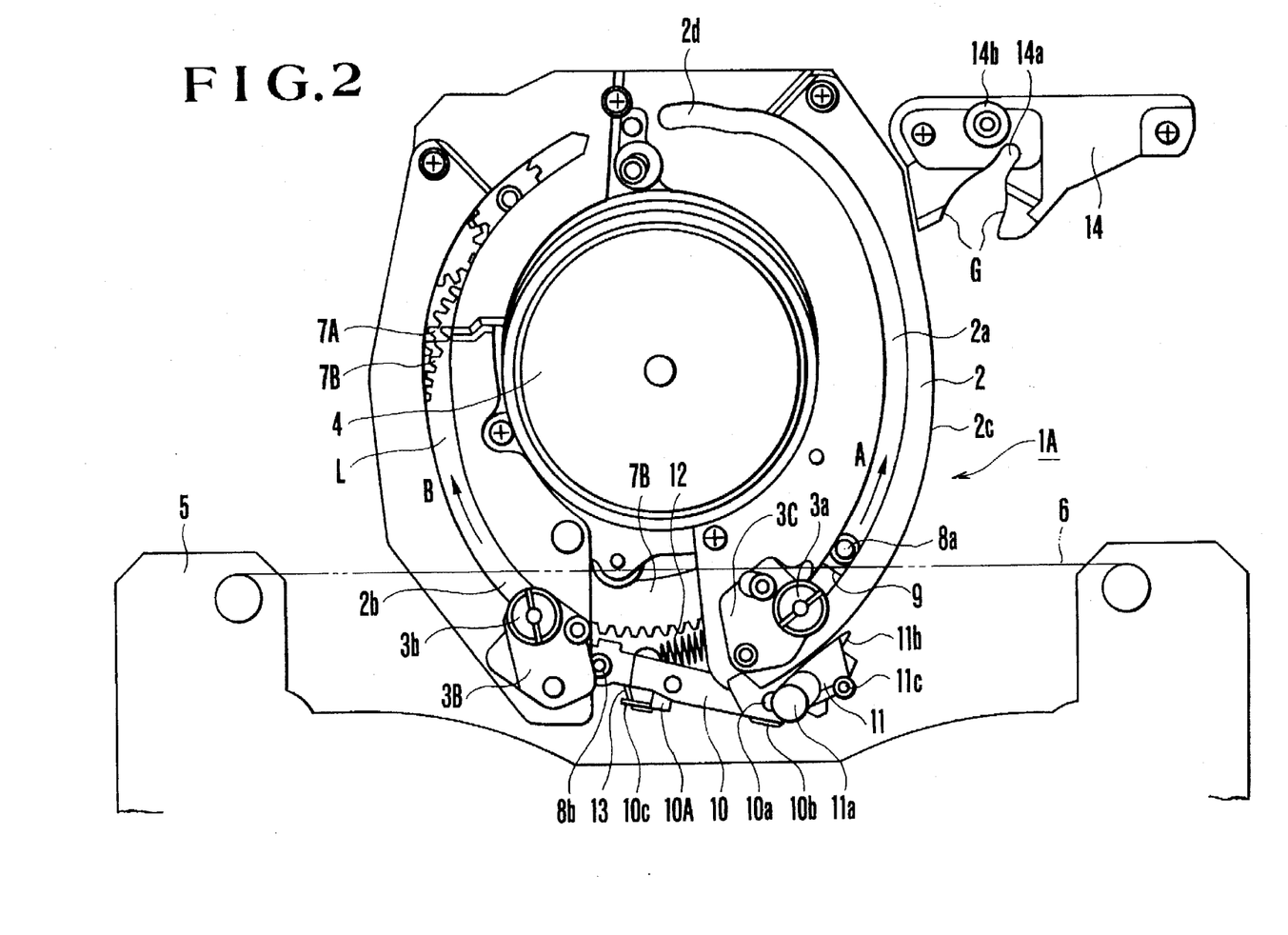
FIG. 2 is a plan view showing the unloading state of the essential parts of a magnetic recording and reproducing apparatus which is arranged according to this invention as an embodiment thereof.
Figure 3:
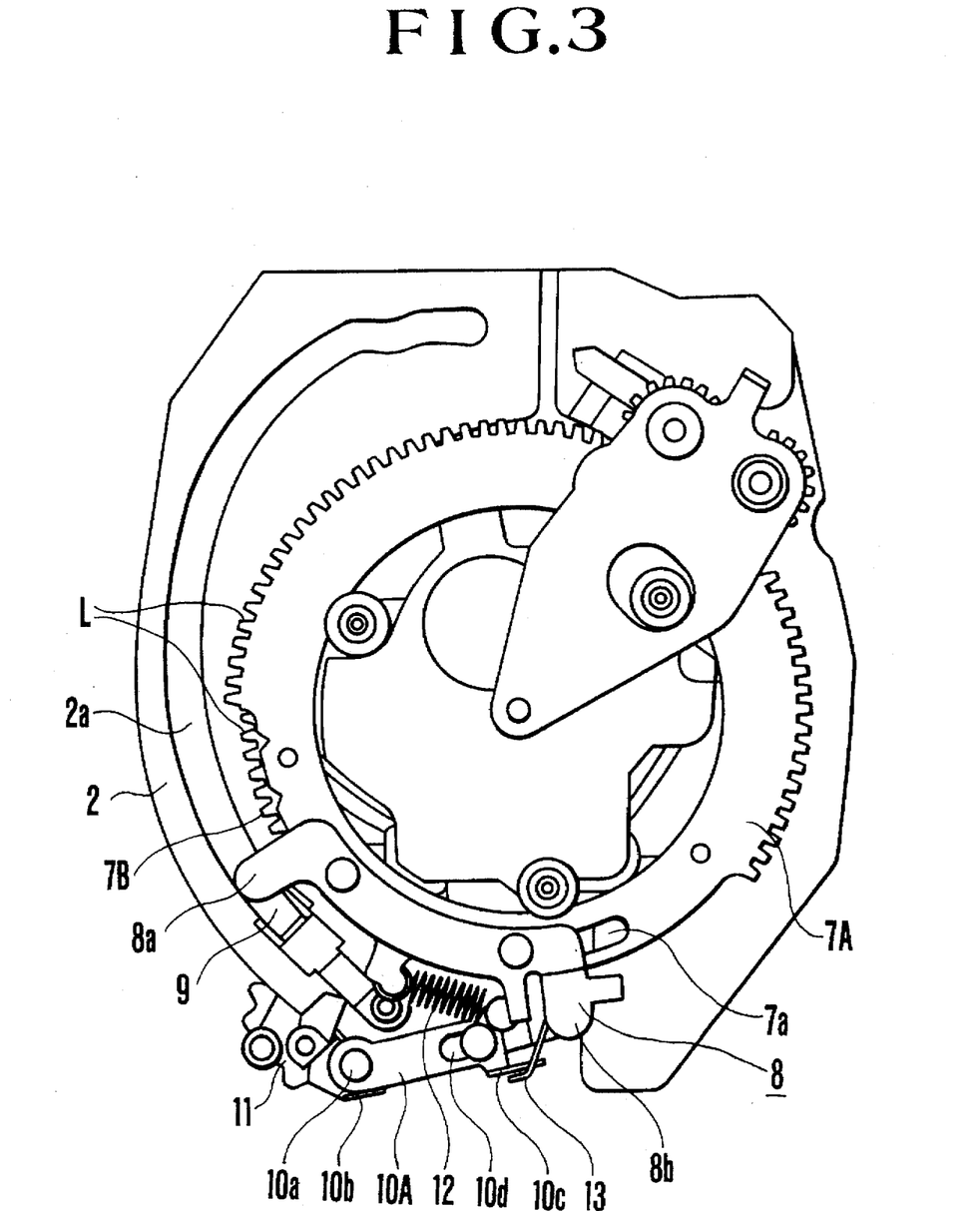
FIG. 3 is a rear view of the essential parts of the same magnetic recording and reproducing apparatus.
Figure 4:
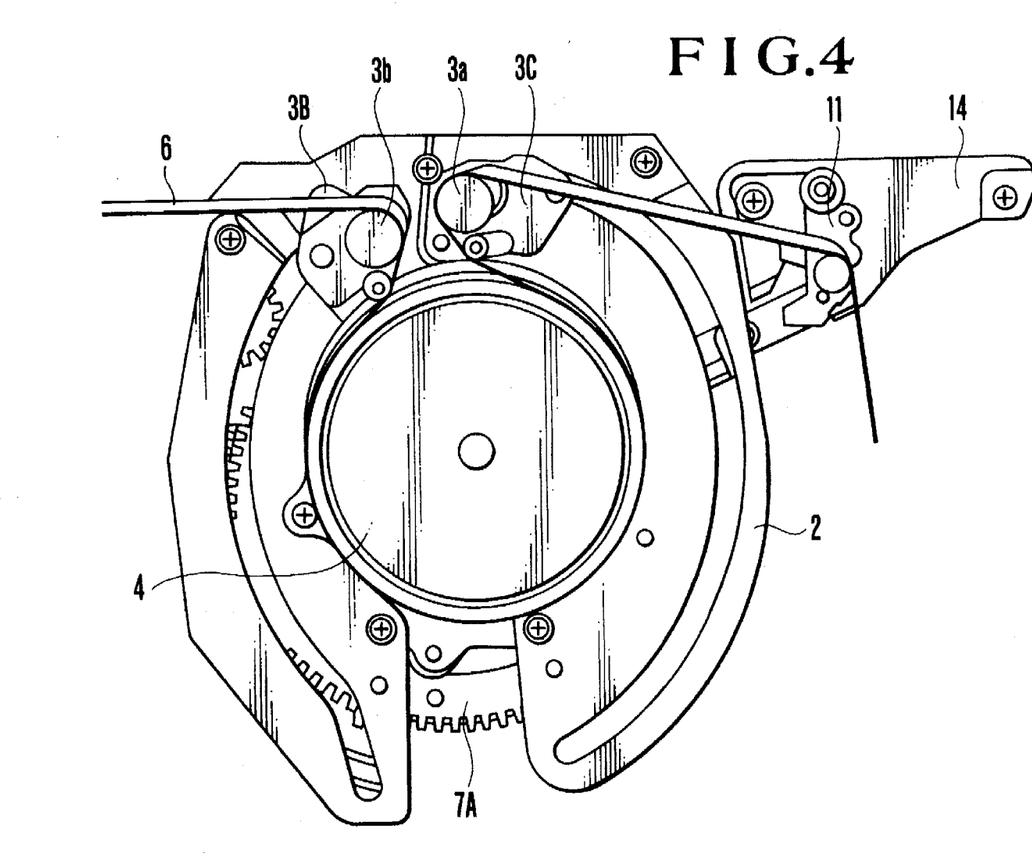
FIG. 4 is a plan view showing the essential parts of the same apparatus as in a loading state.
Figure 5:
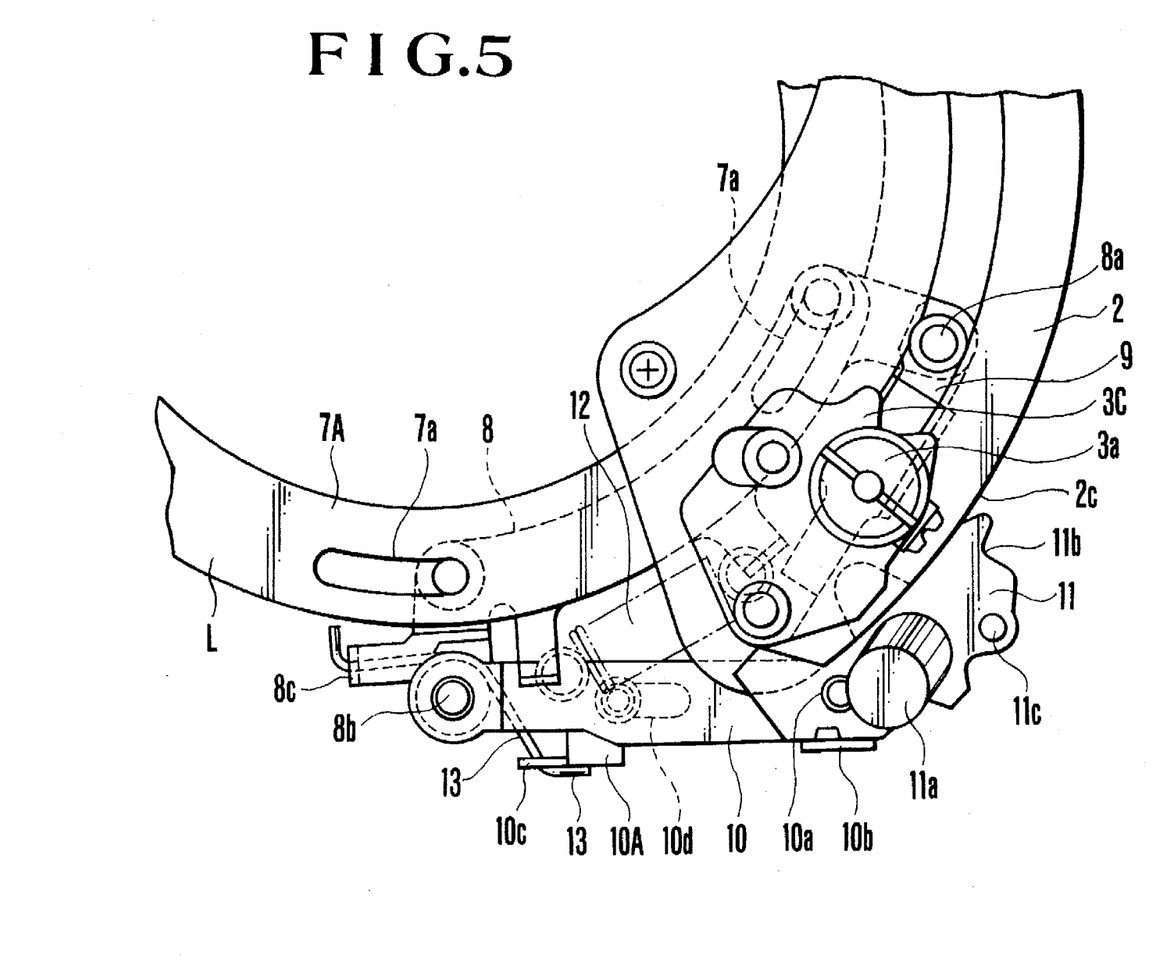
FIG. 5 is an enlarged plan view showing the essential parts of the same apparatus as in its unloading state.
Figure 6:
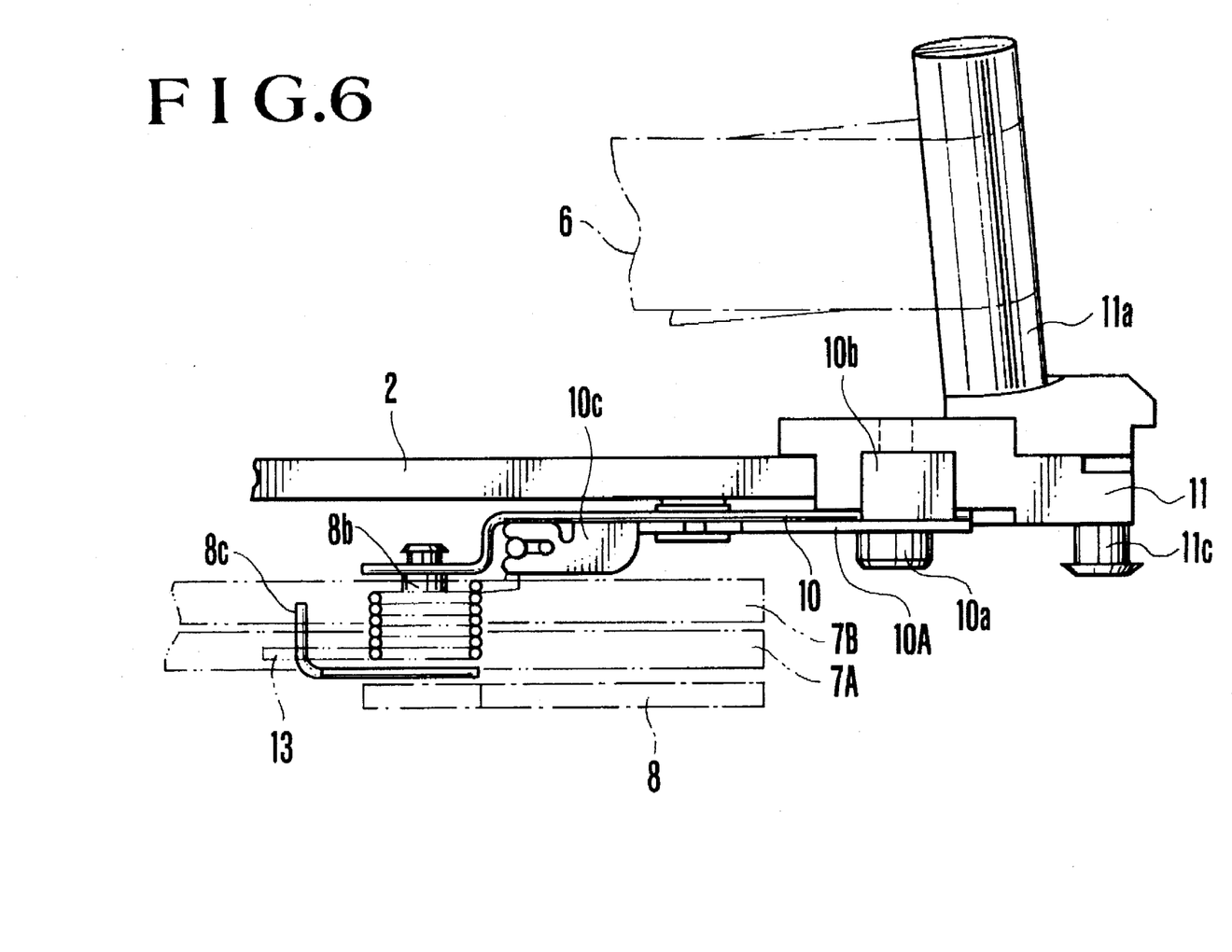
FIG. 6 is a side view showing the essential parts of the same apparatus.
Figures 7, 8:
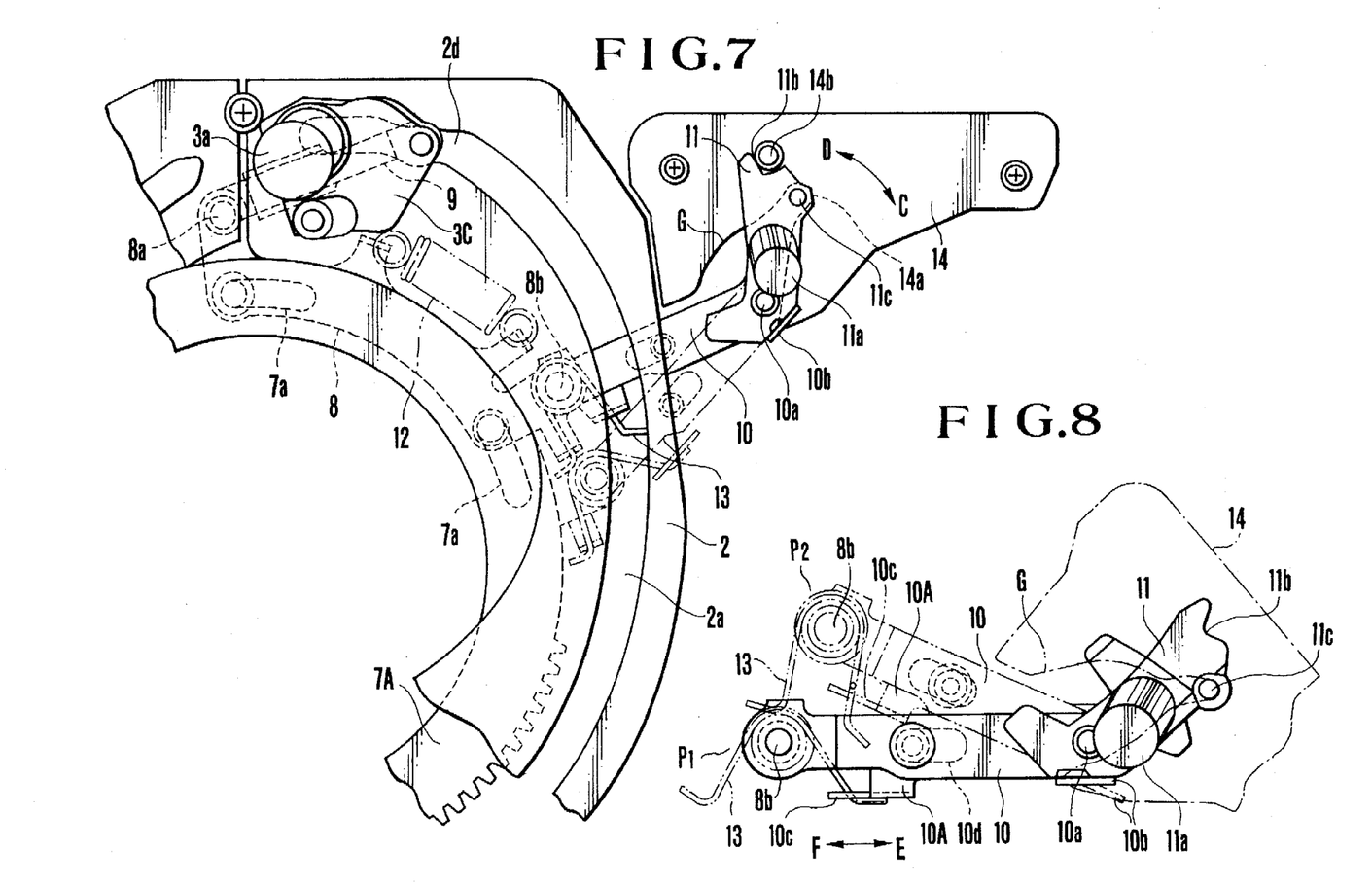
FIGS. 7 and 8 show the tape loading operation of the embodiment.

The following describes embodiments of this invention with reference to the drawings:

FIG. 2 shows in a plan view the unloading state of the essential parts of a magnetic recording and reproducing apparatus which is arranged as an embodiment of the invention. FIG. 3 shows in a rear view the essential parts of the same embodiment. FIG. 4 shows in a plan view the loading state of the essential parts of the same embodiment. FIG. 5 shows in an enlarged plan view the unloading state of the essential parts of the same embodiment. FIG. 6 shows in a side view the essential parts of the same embodiment. FIGS. 7 and 8 show the loading operation of these essential parts.

The parts of this embodiment which are either the same as or corresponding to those of the example of the conventional arrangement described in the foregoing are indicated by the same reference numerals.

Referring to FIGS. 2 to 8, the body 1A of the apparatus is placed on the base (not shown) of a rotary drum 4. A reference numeral 3C denotes a tape pull-out member (a pull-out member). A numeral 7A denotes one of the loading rings which form a loading mechanism L. A numeral 7B denotes the other loading ring. A slide member 8 is slidably carried by the loading ring 7A by being fitted in two slots 7a which are provided in the loading ring 7A. First and second support shafts (or fulcrums) 8a and 8b are disposed at protruding parts on both sides of the slide member 8. One end of an arm 9 (hereinafter referred to as a first arm) is Swingably carried by the first support shaft 8a. The pull-out member 3C is carried by the other end of the first arm 9. The movement of the pull-out member 3C is arranged to be guided by a guide slot 2a which is formed in a guide member 2. The slide member 8 is urged by a coiled spring 12 to move counterclockwise relative to the loading ring 7A.

An arm 10 (hereinafter referred to as a second arm) is swingably carried by the second support shaft 8b of the slide member 8. A slide arm 10A has a slot 10d which is formed in the longitudinal direction of the second arm 10. A pin provided on the second arm 10 is fitted into the slot 10d to have the slide arm 10A carried by the second arm 10 in such a way as to be slidable in the longitudinal direction of the second arm 10. A third support shaft 10a is provided at the fore end of the slide arm 10A. A tape pull-out aiding member 11 is swingably carried by the third support shaft 10a. A spring support piece 10c is formed in a bent shape on the outside of the slide arm 10A. Another spring support piece 8c is disposed adjacent to the second support shaft 8b of the slide member 8. A torsion spring 13 is supported by these pieces 10c and 8c at its ends and is wound around the second support shaft 8b. The torsion spring 13 is thus arranged to space the second support shaft 8b and the third support shaft 10a to a maximum distance in a first position P1 which is as shown in FIG. 8. In the first position P1, the second arm 10 is urged by the torsion spring 13 counterclockwise, i.e., in the direction of arrow A as shown in FIG. 2. At the same time, the torsion spring 13 urges the slide arm 10A to expand in the longitudinal direction of the second arm 10 as indicated by an arrow E in FIG. 8. Then, under the urging force of the torsion spring 13, the pull-out aiding member 11 abuts on the periphery 2c of the guide member 2 through the slide arm 10A to have its sliding movement guided by the periphery 2c of the guide member 2.

A stopper 10b is erected on one side face of the fore end part of the slide arm 10A for restricting, in the position P1, the swing of the pull-out aiding member 11 around the third support shaft 10a. The pull-out aiding member 11 is provided with a guide roller 11a, a stopper receiver 11b and a guide stopper 11c.

A positioning member 14 is disposed on the base of the drum 4. The positioning member 14 is provided with a positioning stopper receiver 14a (hereinafter referred to as a stopper receiver); a stopper 14b; and a guide part G which is formed along the inner side face of the positioning member 14 and arranged to guide the pull-out aiding member 11. With the pull-out aiding member 11 guided by this guide part G, the slide arm 10A is pushed in the direction of arrow F as shown in FIG. 8 against the urging force of the torsion spring 13. Then, in the second position P2 where the distance between the second support shaft 8b and the third support shaft 10a becomes a minimum value as shown in FIG. 8, the counterclockwise urging force of the torsion spring 13 in the direction of arrow A of FIG. 2 is almost completely nullified. As a result, the urging force of the torsion spring 13 is exerted only in the longitudinal direction of the second support shaft 10, i.e., in the direction of arrow E as shown in FIG. 8.

The slots 7a provided in the loading ring 7A, the slide member 8, the second support shaft 8b, the second arm 10, the slide arm 10A, the third support shaft 10a, the slot 10d, the pull-out aiding member 11, the torsion spring 13 and the positioning member 14 jointly form the differential means for causing the pull-out member 3C and the pull-out aiding member 11 to be revolved at different angles of revolution.

The operation of the embodiment arranged in the above-state manner is described, with reference again to FIGS. 2 to 8, as follows: when the apparatus body 1A is loaded with a cassette 5, the cassette 5 comes down to be set on the apparatus body 1A in such a way as to have the guide rollers 3b, 3a and 11a of the pull-out members 3B and 3c and the pull-out aiding member 11 interposed between the cassette 5 and the tape 6. Next, in response to an operation for recording or reproduction, driving by a loading motor (not shown) causes the loading rings 7A and 7B to rotate respectively counterclockwise, i.e., in the direction of arrow A of FIG. 2 and clockwise, i.e., in the direction of arrow B of FIG. 2.

The rotation of the loading ring 7A causes the slide member 8 to revolve also counterclockwise through the force of the spring 12. The pull-out member 3C and the pull-out aiding member 11 are guided respectively by the guide slot 2a and the periphery 2c of the guide member 2 to revolve counterclockwise together.

The guide stopper 11c of the pull-out aiding member 11 then comes to abut on the guide part G of the positioning member 14 of the differential means halfway in the process of tape loading. The swing of the pull-out aiding member 11 is then guided to be made clockwise, i.e., in the direction of arrow C of FIG. 7, around the second support shaft 8b. Then, the pull-out aiding member 11 is in the first position P1 where the distance between the second support shaft 8b and the third support shaft 10a is at its maximum value as shown in FIG. 8. In this position, the pull-out aiding member 11 is unable to swing relative to the third support shaft 10a. With the revolution advancing further, the second arm 10 and the slide arm 10A are contracted, through the guide of the guide part G, against the urging force of the spring 13. This gives the second position P2 where the distance between the second support shaft 8b and the third support shaft 10a reaches the minimum value. The pull-out aiding member 11 reaches a position defined by the positioning member 14. The stopper receiver 11b and the guide stopper 11c then abut respectively on the stopper 1ab and the stopper receiver 14a for positioning. This enables the pull-out aiding member 11 to relatively swing counterclockwise around the third shaft 10a in the direction of arrow D of FIG. 7. Further, the urging force of the spring 13 in the direction of rotation of the loading ring 7A, i.e., in the direction of arrow A of FIG. 2, is almost completely nullified, and the urging force of the spring 13 is exerted only in the longitudinal direction of the second arm 10, i.e., in the direction of arrow E of FIG. 8.

This alleviates the load imposed thereafter on the further rotation of the loading ring 7A. After that, the slide member 8 which forms the differential means slides within the slots 7a of the loading ring 7A. Then, at the same time, the pull-out aiding member 11 comes to relatively swing around the third support shaft 10a counterclockwise, i.e., in the direction of arrow D of FIG. 7 to commence differentiation of angle of revolution. Following this, the pull-out member 3C continues to revolve and thus comes to ride on a guide slot 2d provided in the base of the rotary drum 4 from the guide slot 2a of the guide member 2. The pull-out member 3C and the pull-out aiding member 11 are revolved at different angles of revolution from each other by the differential means. The pull-out member 3C is then set in a position where a desired angle of inclination of the tape is obtained relative to the rotary drum 4 and the tape loading comes to an end in a state as shown in FIG. 4.

The differential means is thus arranged to be capable of causing the pull-out member 3C and the pull-out aiding member 11 to revolve at different angles of revolution by a degree required between them in tape loading despite of its simple arrangement. Therefore, the embodiment is capable of easily and reliably obtaining the desired angle of inclination of the tape relative to the small-diameter rotary drum with the loading mechanism arranged in a relatively simple manner.

The embodiment is capable of not only advantageously coping with a reduction in diameter of the rotary drum but also has the following advantage in that the base of the rotary drum can be arranged to have no inclination to permit perpendicular mounting of the rotary drum on the base. This permits a reduction in thickness of the VTR (or apparatus) as well as a reduction in size thereof.

This invention is not limited to the arrangement of the embodiment described above. In accordance with the invention, the loading mechanism may be formed with some other differential means which is suitably arranged to cause the tape pull-out member and the tape pull-out aiding member which are in combination to effectively revolve at angles of revolution which differ from each other by a degree required for obtaining the desired angle of inclination of the tape.

As described above, the embodiment comprises the tape pull-out aiding member which is arranged in combination with one of the tape pull-out members of the tape loading mechanism; and the differential means which is arranged between the tape pull-out aiding member and the one of the tape pull-out member to cause the two members to revolve at different angles of revolution. The differential means includes the slide member which is slidable in the direction of revolution and the positioning member. The positioning member is arranged to restrict the movement of the tape pull-out member combined with the tape pull-out aiding member and that of the tape pull-out aiding member in such a way as to cause the two members to revolve at different angles of revolution by locking the tape pull-out aiding member. The tape is thus allowed to have a desired angle of inclination relative to the rotary drum by virtue of this differential means. The tape pull-out aiding member is swingably carried by the support shaft (a fulcrum) provided at the fore end of the slide arm which is carried to be expandable and contractible in the longitudinal direction of the arm which is swingably carried by the slide member. Further, the tape pull-out aiding member is arranged to be unswingable relative to the slide arm in the first position where the distance between the fulcrum (support shaft) of the arm and that of the slide arm is at its maximum value and to be swingable in the second position where the distance between the fulcrum of the arm and that of the slide arm is at its minimum value. Further, in the first position of the process of wrapping the tape around the rotary drum, the torsion spring exerts its urging force on the arm and the slide arm in the direction of revolution of the slide member and in the direction of expanding the slide arm. In the second position which obtains in the final stage of the tape wrapping process, the urging force in the direction of revolution of the slide member is almost completely nullified and the urging force is exerted solely in the direction of expanding the slide arm.

With the embodiment arranged in this manner, in loading the tape, the differential means for differentiating the angles of rotation causes, despite the simple tape loading mechanism, the tape pull-out member and the tape pull-out aiding member to revolve at different angles of revolution, so that a desired angle of inclination of the tape relative to the rotary drum can be easily and reliably obtained even in a case where the rotary drum is arranged to have a small diameter. The invented arrangement not only enables the embodiment to cope with a reduction in diameter of the rotary drum by just adding the tape pull-out aiding member to the simplified loading mechanism but also permits the rotary drum to be mounted perpendicularly to the chassis of the apparatus body to avoid mounting at a slant. The arrangement thus permits a reduction in size and thickness of the magnetic recording and reproducing apparatus.

Further, in the embodiment described, the periphery 2c of the guide member 2 is arranged to serve as a guide for the tape pull-out aiding member 11. This obviates the necessity of providing any additional guide slot and thus permits a reduction in size of the apparatus.

Figure 9:
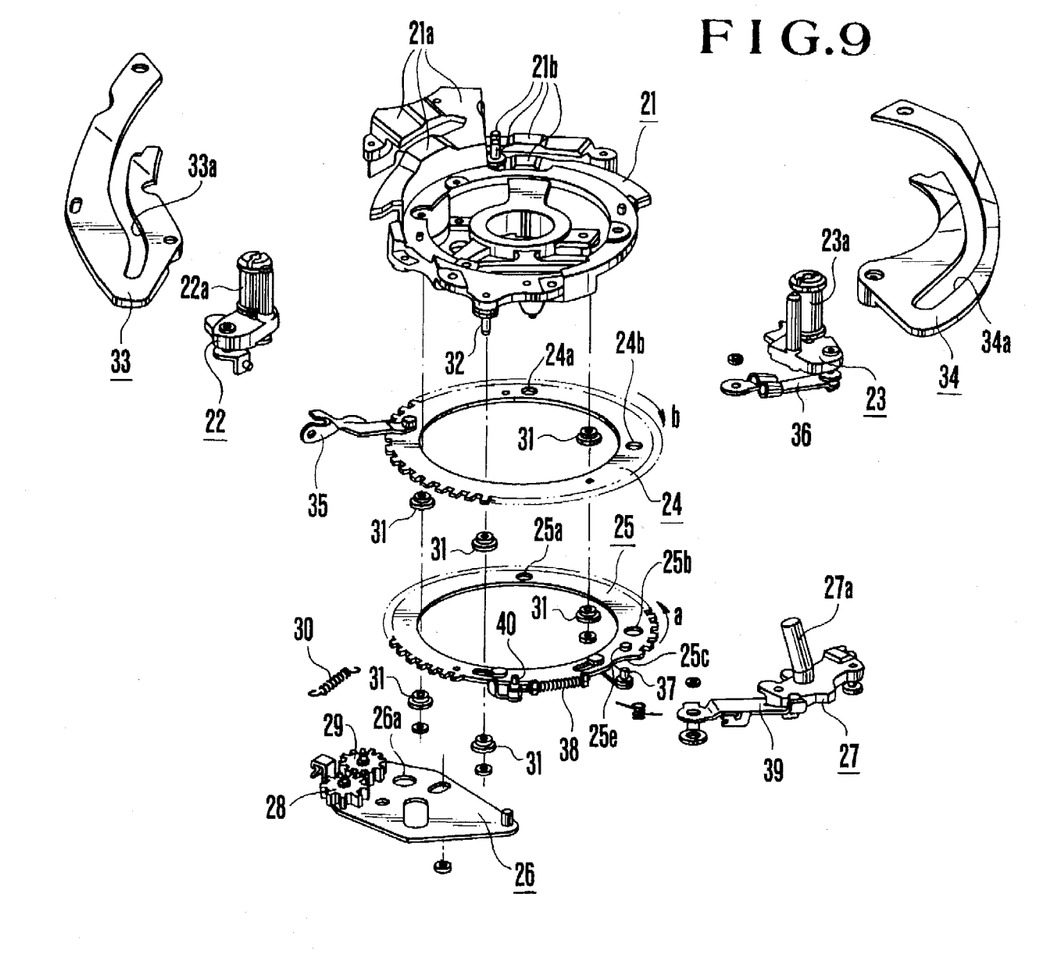
FIG. 9 is an exploded oblique view showing the tape loading unit of a VTR arranged as another embodiment of the invention.

The following further describes the details of this invention through another embodiment thereof:

FIG. 9 is an exploded oblique view showing the arrangement of a loading unit forming the tape loading mechanism of a VTR arranged according to this invention as another embodiment thereof. The component members of the loading unit and its composition are first described.

A reference numeral 21 denotes a drum base which supports a drum which carries magnetic heads (not shown). The drum base 21 is provided with positioning members 21a and 21b which are formed in one body with the base 21 and are arranged to be used for positioning guide bases 22 and 23. Guide bases 22, 23 and 27 are provided with guide posts 22a, 23a and 27a, respectively, for guiding a magnetic tape.

Each of the guide bases 22, 23 and 27 serves to guide the magnetic tape which is not shown. The guide base 22 is movably connected through an arm 35 to a first loading ring (hereinafter referred to as an upper ring or ring) 24. The guide bases 23 and 27 are movably connected through arms 36 and 39 to the shafts 37 and 40 of a second ring (or a lower ring) 25, respectively. The shafts 37 and 40 are arranged to be slidable in the direction of the circumference of the lower ring 25, and are urged to move counterclockwise by a spring 38.

The rings 24 and 25 are arranged to rotate so as to move the guide bases 22, 23 and 27, and have gear teeth formed along their peripheries for the purpose of transmitting the force of rotation. These rings 24 and 25 are mounted through rollers 31 on at least three shafts which are protruding from the lower side of the drum base 21. They are arranged in parallel to orthogonally confront each other and are rotatably mounted on the drum base 21. Further, the lower ring 25 has a larger outside diameter than the upper ring 24 and also has a larger angle of rotation in tape loading which will be described later. The lower ring 25 has a projection 25e as will be described later. A reference numeral 26 denotes a gear plate which is provided for transmission of a rotation force between the rings 24 and 25. For this purpose, the gear plate 26 supports a gear train consisting of two gears 28 and 29 and is mounted on the lower side of the guide base 21 from below the rings 24 and 25. In this instance, the gear 28 is engaged with the peripheral teeth of the lower ring 25 and the gear 29 with those of the upper ring 24. The gear plate 26 is arranged to be able to revolve around the center of rotation of the rings 24 and 25 in such a way as to enable the gears 28 and 29 to move along the peripheries of the rings 24 and 25. The gear plate 26 is urged to move clockwise by a spring 30.

Further, to prevent the gear 29 which is engaging the upper ring 24 from touching the lower ring 25 in mounting the gear plate 26 on the drum base 21 from below the rings 24 and 25, the ring 25 is provided with a cutout part 25c in a given part of its periphery for evading the gear 29. At this part, the gear 29 is allowed to engage the upper ring 24.

Guide slots 33a and 34a are formed in guide rails 33 and 34 and arranged to guide the guide bases 22 and 23, respectively. These guide rails 33 and 34 are secured to the drum base 21.

A drum which is not shown is secured to the drum base 21 by means of mounting screws. These screws are inserted into screw holes formed in the drum base 21 in such parts that are orthogonally opposed to the plate parts of the rings 24 and 25. Therefore, to permit the screws to be tightened or removed for mounting or demounting the drum through the rings 24 and 25, holes 24a, 24b, 25a and 25b are formed in the rings 24 and 25 in positions where these holes orthogonally confront the above-stated screw holes at predetermined phases of rotation of the rings 24 and 25.

Figure 10:
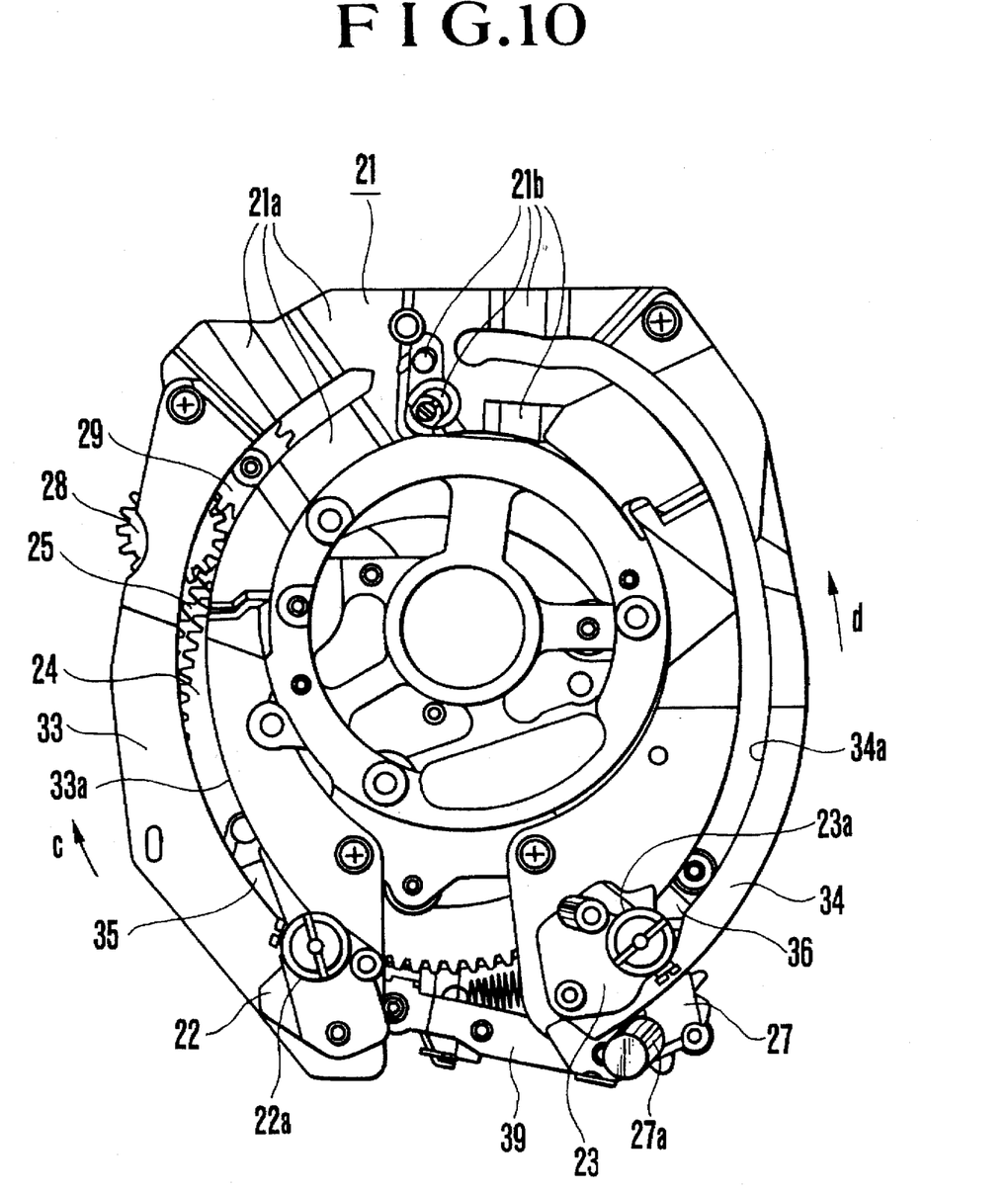
FIG. 10 is a top view showing the same unit as in an assembled state.
Figure 11:
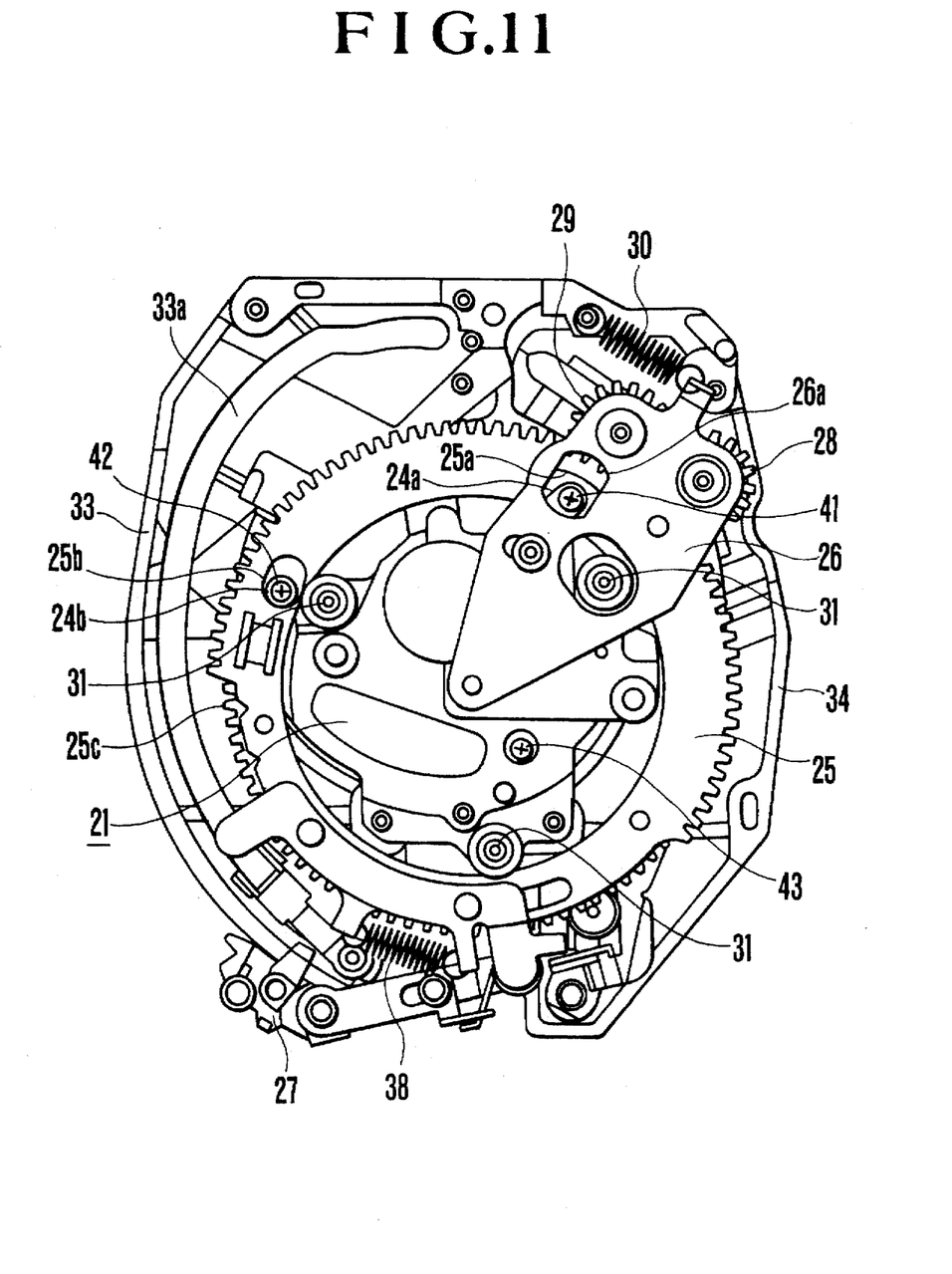
FIG. 11 is a bottom view showing the same unit as in the assembled state.
Figure 12:
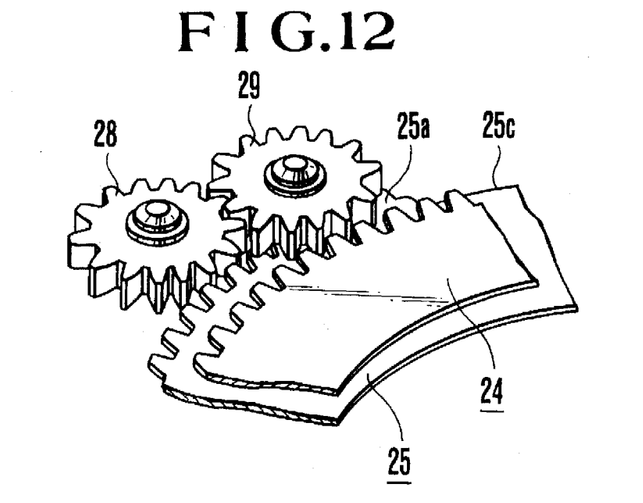
FIG. 12 is an oblique view showing loading rings and gears.

The loading unit is formed by assembling the above-stated component members. FIG. 10 shows the upper side of the assembled loading unit while FIG. 11 shows the lower side of the loading unit. The loading unit is mounted on a chassis supporting the whole mechanism of the VTR which is not shown. In mounting, the drum base 21 is secured by means of screws to the chassis.

The following describes a loading operation performed by the loading unit described above:

In loading, the lower ring 25 is first driven by a loading motor which is not shown to rotate counterclockwise in the direction of arrow "a" shown in FIG. 9. The force of rotation thus obtained is transmitted to the upper ring 24 by the gears 28 and 29. The ring 24 rotates clockwise in the direction of arrow "b" of FIG. 9. In association with the rotation made by the rings 24 and 25, the guide bases 22 and 23 move from a first position which is obtained at the front end as viewed on FIG. 10 through the guide slots 33a and 34a of the guide rails 33 and 34 to a second position which is located at the rear end. This causes the magnetic tape which is not shown to move to be wrapped around a drum (not shown).

Upon arrival at the second position, the guide bases 22 and 23 engage the positioning members 21a and 21b to be set in position respectively. When the lower ring 25 is further rotated counterclockwise, the spring 38 is pulled and elongated as the guide base 23 is no longer movable. The resilient force of the spring 38 thus developed pushes the guide base 23 against the positioning member 21b to keep it immobile. Further, the rotation of the upper ring 24 is prevented as the guide base 22 is immobile. As a result, the rotation force of the lower ring 25 causes the gears 28 and 29 to rotate. These gears 28 and 29 then come to revolve counterclockwise around the rings 24 and 25 and elongated the spring 30. As a result, the upper ring 24 is urged to move clockwise by the resilient force of the spring 30. The guide base 22 is then pushed against the positioning member 21a to be kept immobile. The loading operation is completed in the above-stated manner. An unloading operation is performed in a manner reverse to the operation described above.

The loading unit of this embodiment is obtained by mounting the members such as rings 24 and 25, etc., on the drum base 21. Therefore, the components members including the rings 24 and 25 can be mounted in one unit on the VTR. Compared with the conventional method of mounting them individually on the chassis, the assembly work on the embodiment is much simpler and easier. Therefore, the assembly workability of the VTR can be greatly improved. Besides, the invented arrangement contributes to a reduction in size. Further, management of component parts can be rationalized with the parts handled in units.

As apparent from the foregoing description, in a magnetic recording and reproducing apparatus of the kind wrapping a magnetic tape around a magnetic head drum by rotating two ring members to which tape guide posts are connected, a tape loading mechanism is arranged, in accordance with the arrangement of this embodiment, to include a drum base which supports the drum and is secured to the chassis of the apparatus; and to have the two ring members rotatably mounted on the drum base. In accordance with this arrangement, the components parts of the loading mechanism including the drum base and the ring members can be simply and easily mounted in one block oh the magnetic recording and reproducing apparatus (or VTR). The embodiment has great advantages in that the assembly workability can be saliently improved and that the invented arrangement contributes to a reduction in size of the apparatus.

A further advantageous feature of the embodiment is described as follows: at the end of the above-stated loading process, the lower ring 25 engages the gear 28 at its gear part 25a. Meanwhile, the cutout part 25c of the lower ring 25 is located below the gear 29.

When the unloading operation is performed under this condition, if the space between the gears 28 and 29 is arranged to be narrow for the purpose of reducing the thickness of the mechanism, the gear part 25a of the lower ring 25 might interfere with the upper gear 29 to prevent normal unloading or might come to break the mechanism.

Figure 13:
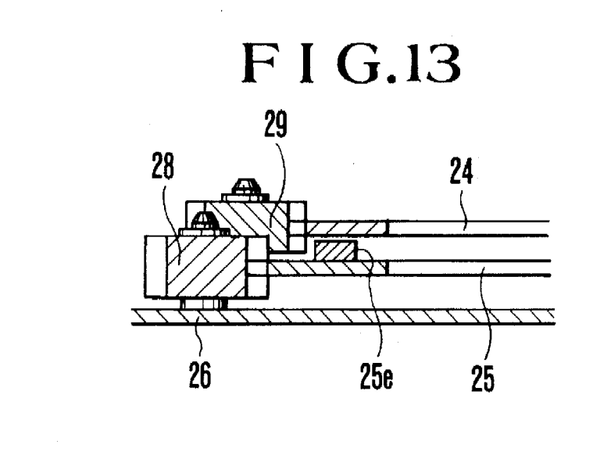
FIG. 13 is a sectional view Showing the loading rings and the gears.

To solve this problem, the embodiment is arranged to have the projection 25e formed on the upper surface of the lower ring 25 which is opposed to the upper ring 24 as shown in a sectional view in FIG. 13. This projection 25e is formed at a part of the upper surface of the lower ring 25 which comes near to the gears 28 and 29 at the end of the loading process and particularly is located in the neighborhood of a boundary between the gear part 25a of the lower ring 25 and the cutout part 25c where the ring 25 has no gear part.

With the projection 25e provided on the surface of the lowering 25 which is opposed to the upper ring 24, the unloading operation can be adequately accomplished by driving the rings in such a way as to smoothly bring the gear part 25a of the lower ring 25 to a position on the lower side of the gear 29 without causing it to interfere with the gear 29.

Therefore, unlike the conventional arrangement, the space between the rings 24 and 25 can be narrowly arranged to permit a reduction in size of the loading mechanism and, therefore, a reduction in size and thickness of the apparatus as a whole.

Figure 14:
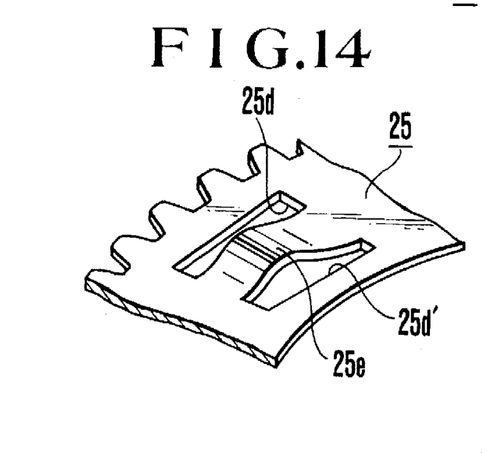
FIGS. 14 and 15 are oblique views showing the essential parts of the ring.
Figure 15:
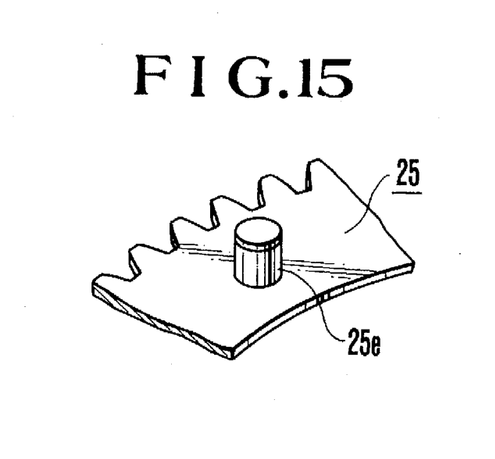

The projection 25e can be formed on the lower ring 25 in various manners. For example, two slits 25d and 25d' are formed by punching the lower ring 25 and then an intermediate part between these slits are bent up as shown in FIG. 14. In another example, the projection 25e is formed by inserting a boss with pressure as shown in FIG. 15. In the case of die casting, the projection 25e can be formed in one body with the lower ring 25.

As apparent from the foregoing description, in the magnetic recording and reproducing apparatus which is arranged as an embodiment of this invention to load or unload a magnetic tape on or from the magnetic head drum by gear-driving a plurality of tape guide members through a plurality of loading rings respectively, a projection is formed on one of the loading rings on its side which is opposed to the other ring. Therefore, a space is insured by virtue of the projection, so that a plurality of loading rings can be adequately driven without interference. It is, therefore, not necessary to have a side space between the loading rings like the conventional arrangement. The provision of the projection thus enables the embodiment to contribute further to a reduction in size and thickness of the apparatus as a whole.

What is claimed is:

1. A recording and/or reproducing apparatus for recording and/or reproducing information by pulling out a tape from a cassette by moving a pair of tape pull-out members in opposite directions with a loading mechanism and by wrapping the tape around a rotary drum, comprising:

a) a tape pull-out aiding member for pulling out said tape in combination with one of said tape pull-out members; and b) differential means arranged between said one of said tape pull-out members and said tape pull-out aiding member to cause said one of said pull-out members and said tape pull-out aiding member to revolve at different angles of revolution, and said differential means including a slide member along said rotary drum, and said tape pull-out aiding member being swingably carried by a fore-end of a slide arm which is carried to be movable in a longitudinal direction of the slide arm and which is swingably carried by said slide member, and every portion of said differential means moving with said one of said tape pull-out members and said tape pull-out aiding member along said rotary drum.

2. An apparatus according to claim 1, wherein said tape pull-out aiding member which is carried by said slide arm is engageable with a stopper and unswingable in a first position in which a distance between a fulcrum of said arm and that of said slide arm is at a maximum value thereof and disengageable from said stopper and swingable in a second position in which the distance between the fulcrum of said arm and that of said slide arm is at a minimum value thereof.

3. An apparatus according to claim 1, wherein said arm and said slide arm are arranged to be urged by a torsion spring in the direction of revolution of said slide member and also in the direction of moving said slide arm during a process of wrapping the tape around the rotary drum, and to be urged by said torsion spring only in the direction of moving said slide arm by almost completely nullifying an urging force of said torsion spring in the direction of revolution of said slide member when the process of wrapping the tape around the rotary drum has ended.

4. A recording and/or reproducing apparatus arranged to load and unload a tape on/or from a head drum by driving a plurality of tape guide members respectively through a plurality of rotatably provided loading rings which are driven by gears, comprising:

a protruding part arranged to be stationary all the time on a first loading ring on one side thereof which is opposed to a second loading ring, said protruding part regulating a gap between said first and second loading rings so that said gap is not smaller than a predetermined distance to permit said first and second loading rings to be driven, said protruding part having a portion inclined in the direction of rotation of said loading ring.

5. An apparatus according to claim 4, wherein said protruding part is disposed in a boundary area between a gear part and a non-gear part of said first loading ring.

6. A tape loading mechanism for a recording and/or reproducing apparatus arranged to wrap a tape around a head carrying drum by rotating two ring members to which guide posts for guiding the tape are connected, comprising:

a drum base secured to a chassis of said magnetic recording and/or reproducing apparatus and arranged to support said drum, said drum base forming parts of a plurality of guide portions for guiding the guide posts, and said two ring members being rotatably mounted on said drum base; and a gear train mounted on said drum base for transmitting a rotational force between said two ring members, wherein said gear train is arranged to be able to revolve in two directions along peripheries of said two ring members and to be urged by an elastic member in one of said two directions.

7. A mechanism according to claim 6, wherein said two ring members are in mutually parallel and confronting disposition, said two ring members having holes formed therein in parts confronting each other at a predetermined phase of rotation, and fixing members for securing said drum to said drum base are arranged to be attached or removed through said holes.

8. A mechanism according to claim 6, wherein said two ring members are in mutually parallel and confronting disposition, and one of said two ring members is provided with a cutout part for escaping a specific gear included in said gear train in mounting said gear train, said cutout part being formed at a predetermined part in a periphery of said one of said ring members.

9. A tape loading mechanism according to claim 6, wherein said parts of the plurality of guide portions include guide portions for guiding said guide posts when tape loading has been completed.

10. A recording and/or reproducing apparatus comprising:

a) a rotary drum arranged to have a tape wrapped around said rotary drum over a predetermined angular range, said rotary drum having heads mounted thereon;

b) a plurality of tape pull-out members for wrapping the tape around said rotary drum;

c) a plurality of rotatably provided driving members arranged to drive said tape pull-out members and superposed on each other in layers; and d) a spacer interposed between said driving members to permit said driving members to be driven, said spacer arranged to be stationary all the time on a surface of one of said driving members and said spacer having a portion inclining in the direction of rotation of said one driving member.

11. An apparatus according to claim 10, wherein said spacer includes a cut-and-raised piece formed on the sum face of one of said driving members.

12. An apparatus according to claim 10, wherein said spacer includes a protruding part provided on the surface of one of said driving members.

13. An apparatus according to claim 10, wherein said driving members include a pair of loading rings.

* * * * *

UNITED STATES PATENT AND TRADEMARK OFFICE
CERTIFICATE OF CORRECTION

PATENT NO. : 5,710,679
DATED : January 20, 1998
INVENTOR(S) : Matsuoka et. al.

It is certified that error appears in the above-identified patent and that said Letters Patent is hereby corrected as shown below:

| | | | | | |
|---|---|---|---|---|---|
| Col. 1, | line 35, | delete | "as go have" | and insert | -- as to have --. |
| Col. 1, | line 40, | delete | "A and B1," | and insert | -- A and B, --. |
| Col. 3, | line 20, | delete | "at the" | and insert | -- at --. |
| Col. 4, | line 45, | delete | "Showing" | and insert | -- showing --. |
| Col. 5, | line 12, | delete | "Swingably" | and insert | -- swingably --. |
| Col. 6, | line 15, | delete | "3c" | and insert | -- 3C --. |
| Col. 10, | line 47, | delete | "lowering" | and insert | -- lower ring --. |
| Col. 12, | line 56, | delete | "sum face" | and insert | -- surface --. |

Signed and Sealed this

Fourteenth Day of July, 1998

*Attest:*

BRUCE LEHMAN

*Attesting Officer*  *Commissioner of Patents and Trademarks*